Patented Dec. 12, 1950

2,533,221

UNITED STATES PATENT OFFICE 2,533,221

CARAMEL COLOR SEPARATION

James E. Cleland and Joseph B. Longenecker, Granite City, Ill., assignors to Union Starch & Refining Company, Columbus, Ind., a corporation of Indiana No Drawing. Application June 6, 1947, Serial No. 753,054

8 Claims. (Cl. 99—148)

The present invention relates to a process for producing a coloring material having a high stability and a high tinctorial power. The process generally comprises the isolation from a caramelized sugar mass of relatively pure coloring compounds or color bodies by separation of said color bodies from the caramelized sugar by selective solvent action (or precipitation).

Color is imparted to various food products by the addition thereto of caramelized sugar. These caramelized sugars are formed by conventional caramelization at high temperature of the order of 200° to 300° F. The caramel color that results in ordinary practice is a mixture of coloring matter and various residual sugar products. This caramel color has a tinctorial power that is limited by the quantity of coloring compounds obtained and the coloring bodies available are limited by the degree of caramelization of the sugar. The caramelization of the sugar cannot go beyond a given point because of the ultimate impairment of the stability of the caramel color caused by overburning. The primary characteristic, namely, coloring power of the caramel bodies has, therefore, been limited in the past by the extent of the caramelization and the stability of the resulting product.

We have now found that we can isolate the coloring bodies contained in a caramelized sugar by the process which is set forth hereinafter and thus obtained a coloring matter of extremely high tinctorial power that is stable to a far higher degree than the normal caramel color manufactured hithertofore.

An object of this invention, therefore, is to provide a new process for making caramel color material adapted to be used in food products.

Another object of the invention is to provide a process of obtaining caramel color from substantially all the caramelizable sugar in a given body or solution.

Another object of the invention is to provide a process of separating the caramel coloring material from a caramelized sugar solution.

Another object of the invention is to provide a process for obtaining a concentrated and substantially undiluted caramel coloring material.

These and other objects ancillary thereto are in general obtained by caramelizing a sugar or sugar solution, treating caramelized sugar with a solvent solution having a selective solvent action to cause the caramel color bodies to separate or precipitate from the caramelized mass, separating the precipitate and recovering and recirculating the solvent solution and the uncaramelized sugar.

The sugar employed may be sucrose, glucose, dextrose, maltose or corn sugar or any desired caramelizing sugar composition. The sugar preferably contains water in such proportions that after caramelization it retains 25-35% of water.

The solvent solution preferably comprises a water soluble alcohol such as methyl, ethyl, propyl, isopropyl or butyl alcohol and an ether, such as methyl ether, ethyl ether, isopropyl ether, lower aliphatic glycol ethers such as dioxane, etc. In place of the ethers it is possible to employ the corresponding ketones. The alcohol generally comprises 70-95% of the total solvent and the ether (or ketone) comprises 5-20% of the total mix. The purpose of the ether or ketone is to regulate the solvent power of the alcohol. To aid in solvent recovery, etc. it is preferable to employ an ether or ketone which boils between 30 and 80° C. Higher boiling ones are difficult to separate from the mother liquor. It is preferably, though not absolutely necessary to add up to 30% of water to the solvent solution. The amount of water added to the solvent depends somewhat on the amount of water in the caramel solution. It is desirable, however, to have sufficient water present (when the caramel color bodies are precipitated) to avoid precipitation of noncoloring bodies and thereby obtain a more concentrated color precipitate. The amount of water present during precipitation should be 15-30% for practical purposes.

The caramelization of the sugar is preferably carried out until a tinctorial power of from 16-30 is reached. The tinctorial power is determined according to the normal color standards which have been set up. For example, a caramel solution would have a tinctorial power of 16 if a 0.1% solution of the caramel matched standard Lovibond slides having a value of 16 units (series #52) when compared with the latter in a standard Lovibond tintometer in which the solution is read in a 1" cell. When a solution containing sugar with 30% water is caramelized it will contain about 20-30% by solids of coloring matter.

The novel features characteristic of the invention are set forth with particularity in the appended claims. The invention itself, however, both as to its organization and its method of operation, together with additional objects and advantages thereof, will best be understood from the following specific example.

Example

A caramelized corn syrup containing about 30% water which has been caramelized in any known way (such as by heating in the presence of an acid or alkali) until it has a tinctorial power of about 24 is dispersed into a large volume of a solvent mixture containing 80% of an 85% ethyl alcohol (15% water) and 20% by volume of ethyl ether. The caramelized mass is dispersed in the solution by spraying it into the said solution. The temperature of the admixture is reduced to below 80° F. The caramel color precipitates and is allowed to settle whereupon the mother liquid and alcohol-ether mixture is separated from the color by decantation, for example. The alcohol and ether are recovered in suitable solvent recovery apparatus and the mother liquid is returned for another caramelization treatment.

The coloring material recovered from the precipitate has at least three or more times the tinctorial power of the original caramelized sugar. The new coloring material is obtained as a dry powder after conventional drying and grinding by conventional methods. It resembles a pigment or dye powder in some properties but is superior to most of these for food use as it is substantially all carbohydrate. The powder is very soluble in water but does not deteriorate in any way on exposure to extremes of atmospheric conditions for long periods.

In addition to obtaining a coloring material having a higher tinctorial power and greater stability the process of the present invention obtains a far higher yield of coloring compounds from the original mass of caramelized corn sugar. Among the primary qualities desired by the user of the caramel coloring are standard or constant coloring properties in respect to intensity and hue. The caramel colors hitherto obtainable exhibited considerable color quality variation according to the condition and time of storage. The isolated coloring constituents or concentrated caramel colors formed according to the present invention have standardized coloring power and do not change under any probable conditions or time of storage.

Although certain specific embodiments of this invention have been shown and described, it will be understood that many modifications thereof are possible. This invention, therefore, is not to be restricted except insofar as is necessitated by the prior art and by the spirit of the appended claims.

We claim:

1. In a process of separating essential coloring compounds from a caramelized water soluble carbohydrate material, the steps comprising dispersing said caramelized carbohydrate in a solution consisting essentially of a major amount of a water soluble alcohol and a solubility regulating liquid having a boiling point of from 30–80° C., whereby the essential coloring compounds are precipitated.

2. In a process of separating essential coloring compounds from a caramelized water soluble carbohydrate material, the steps comprising dispersing said caramelized carbohydrate in a solution consisting essentially of a major amount of a water soluble alcohol and a solubility regulating liquid selected from the class consisting of dialkyl ethers and dialkyl ketones which have a boiling point of from 30–80° C., whereby the essential coloring compounds are precipitated, separating the precipitated color bodies from the mother liquor and solvent liquor.

3. In a process of separating essential coloring compounds from a caramelized water soluble carbohydrate material, the steps comprising dispersing said caramelized carbohydrate in a solution consisting essentially of a major amount of ethyl alcohol and a minor amount of an ether having a boiling point of from 30–80° C., whereby the essential coloring compounds are precipitated and separating the precipitated color bodies from the mother liquor and solvent liquor.

4. In a process of separating essential coloring compounds from a caramelized water soluble carbohydrate material, the steps comprising dispersing said caramelized carbohydrate in a solution consisting essentially of 70–95% of alcohol, 5–20% of an ether having a boiling point of 30–80° C., and 0–30% of water whereby the essential coloring compounds are precipitated, and separating the precipitated color bodies from the mother liquor and solvent liquor.

5. In a process of separating essential coloring compounds from a caramelized water soluble carbohydrate material, the steps comprising dispersing said caramelized carbohydrate in a solution consisting essentially of 70–95% of alcohol, 5–20% of a ketone and 0–30% of water whereby the essential coloring compounds are precipitated and separating the precipitated color bodies from the mother liquor and solvent liquor.

6. In a process of separating essential coloring compounds from a caramelized water soluble carbohydrate material, the steps comprising dispersing said caramelized carbohydrate in a solution consisting essentially of a major amount of a water soluble alcohol and a solubility regulating liquid selected from the class consisting of dialkyl ethers and dialkyl ketones which have a boiling point of from 30–80° C., whereby the essential coloring compounds are precipitated, separating the precipitated color bodies from the mother liquor and solvent liquor and recaramelizing the recovered mother liquor.

7. A caramel color complex essence comprising a dry, non-hygroscopic, water-soluble powder having at least three times the tinctorial power of the unpurified caramelized carbohydrate material, said essence being made by the process of claim 2.

8. A caramel color complex essence comprising a dry, non-hygroscopic, water soluble, powder having a standardized coloring powder which does not change under normal conditions of storage which has at least three times the tinctorial power of the unpurified caramelized carbohydrate material, said essence being made by the process of claim 1.

JAMES E. CLELAND.
JOSEPH B. LONGENECKER.

REFERENCES CITED

The following references are of record in the file of this patent:

UNITED STATES PATENTS

| Number | Name | Date |
|---|---|---|
| 1,418,945 | Luers | June 6, 1922 |
| 1,678,648 | Replogle | July 31, 1928 |
| 2,079,415 | Levinson | May 4, 1937 |

OTHER REFERENCES

"Separation and Identification of Food-Colorings Substances," by W. E. Mathewson, United States Department of Agriculture, Bulletin No. 488, February 15, 1917, Washington, Government Printing Office.